(No Model.) 4 Sheets—Sheet 1.
W. B. SAYERS & W. H. STURGE.
FITTING AND HOISTING GEAR FOR ELECTRIC LAMPS.
No. 412,713. Patented Oct. 8, 1889.
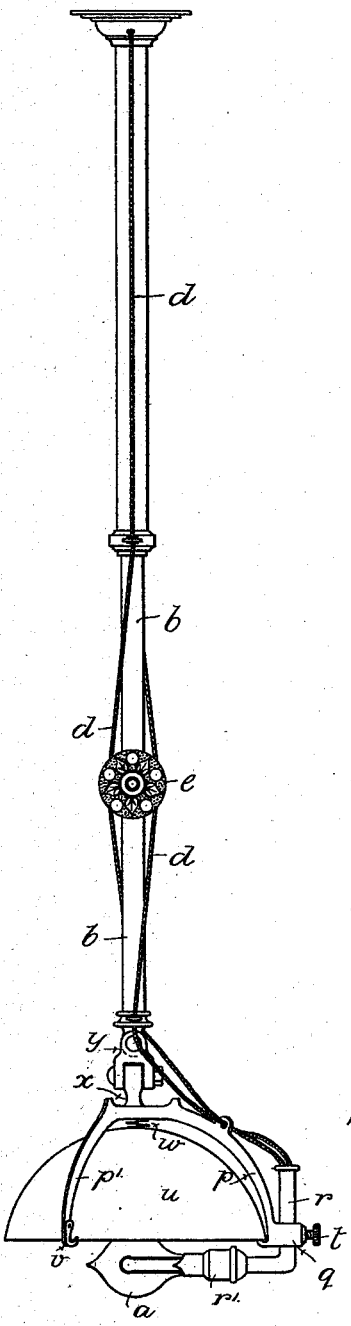
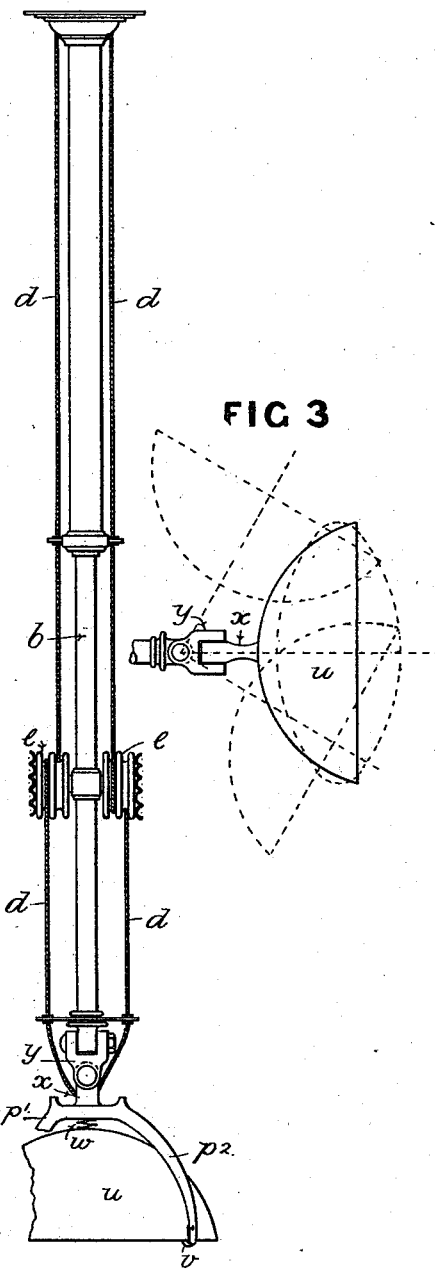
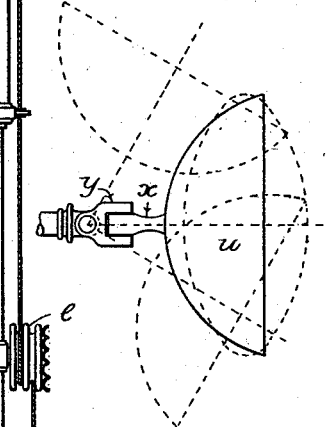
WITNESSES
Ernest W. Jones.
Alfred Johnson.
INVENTORS
William Brooks Sayers
Wilson Henry Sturge
per Charles T. Burrell
Attorney

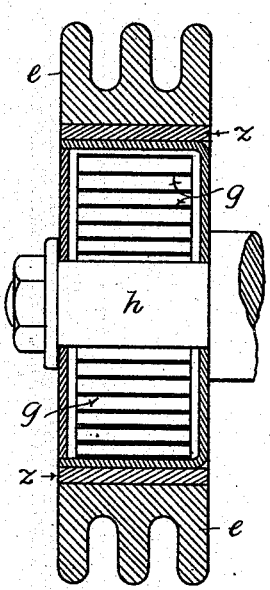
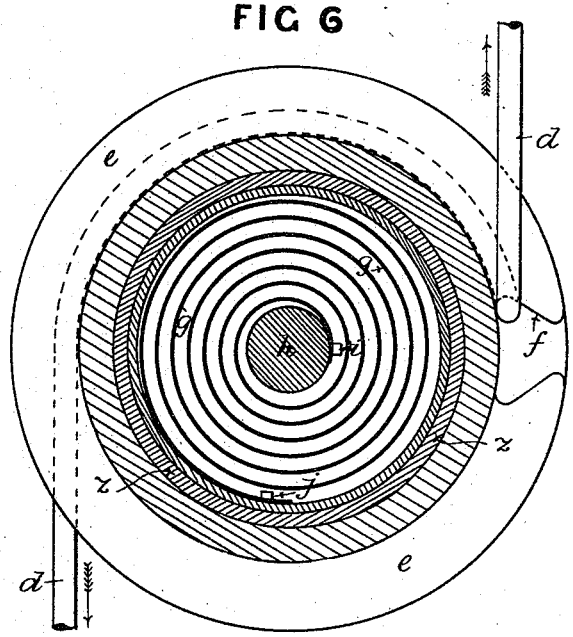
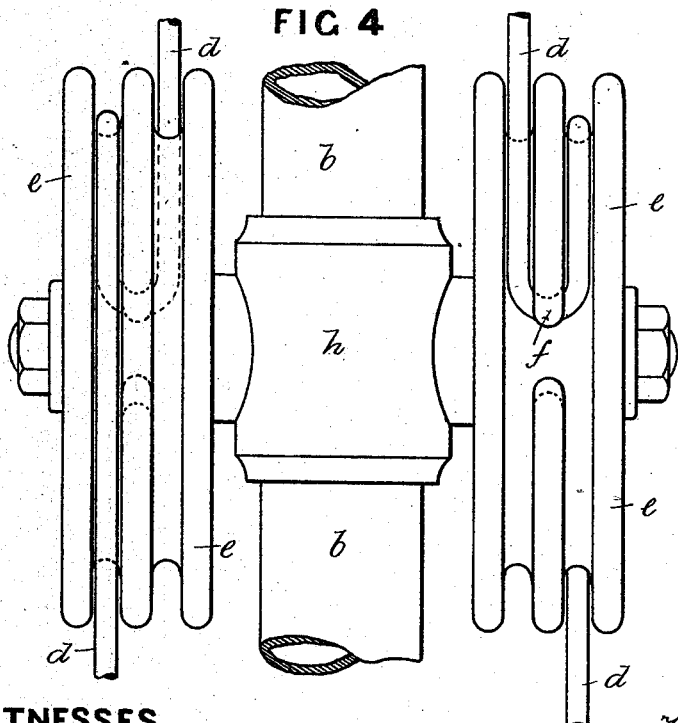

(No Model.) 4 Sheets—Sheet 3.
W. B. SAYERS & W. H. STURGE.
FITTING AND HOISTING GEAR FOR ELECTRIC LAMPS.
No. 412,713. Patented Oct. 8, 1889.
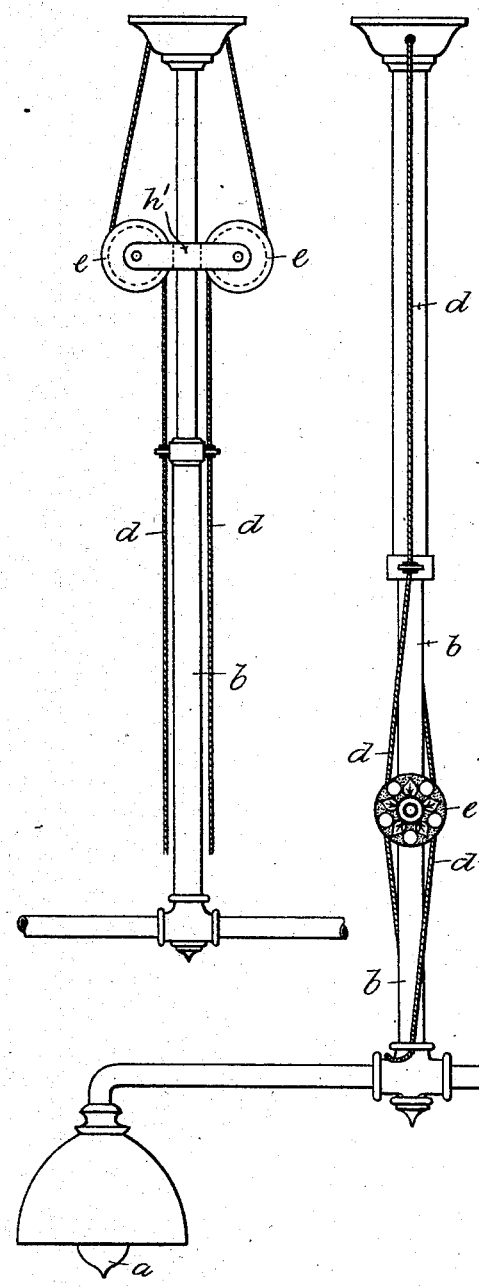
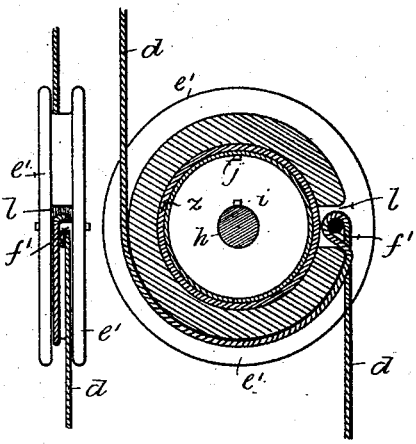
WITNESSES
Ernest W. Jones
Alfred Johnson
INVENTORS
William Brooks Sayers
Wilson Henry Sturge
per Charles T. Powell
Attorney (No Model.) 4 Sheets—Sheet 4.
W. B. SAYERS & W. H. STURGE.
FITTING AND HOISTING GEAR FOR ELECTRIC LAMPS.
No. 412,713. Patented Oct. 8, 1889.
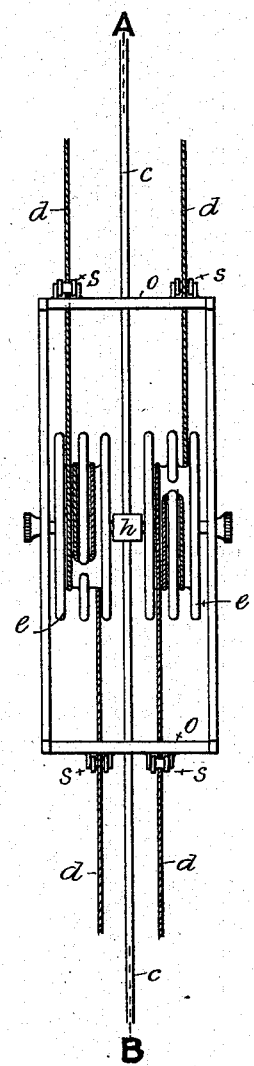
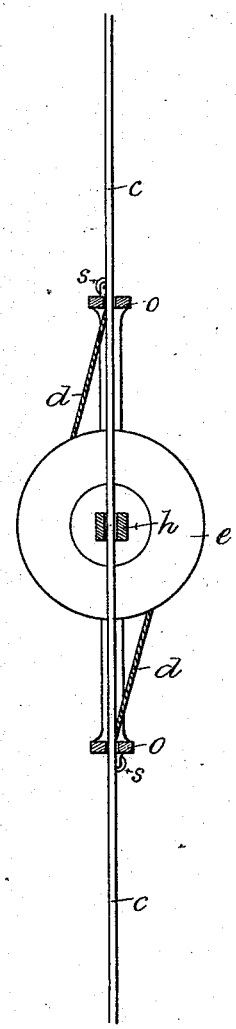
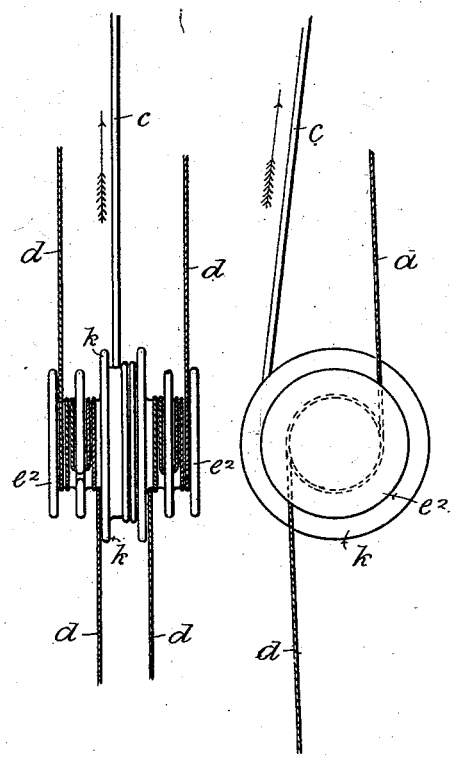
WITNESSES
Ernest W. Jones
Alfred Johnson
INVENTORS
William Brooks Sayers
Wilson Henry Sturge
per Charles J. Powell
Attorney

UNITED STATES PATENT OFFICE.

WILLIAM BROOKS SAYERS, OF LISBON, PORTUGAL, AND WILSON HENRY STURGE, OF BIRMINGHAM, ENGLAND.

FITTING AND HOISTING GEAR FOR ELECTRIC LAMPS.

SPECIFICATION forming part of Letters Patent No. 412,713, dated October 8, 1889.

Application filed June 16, 1888. Serial No. 277,392. (No model.) Patented in England July 19, 1887, No. 10,071.

*To all whom it may concern:*

Be it known that we, WILLIAM BROOKS SAYERS, a subject of the Queen of Great Britain, and at present a resident of the city of Lisbon, Portugal, and WILSON HENRY STURGE, a subject of the Queen of Great Britain, and a resident of 17 Frederick Road, Birmingham, England, have invented certain new and useful Improvements in Fittings and Hoisting Gear for Electric Lamps, (for which we have obtained Letters Patent in Great Britain, No. 10,071, dated July 9, 1887,) of which the following is a specification.

Our invention relates to improvements in electric-lamp fittings, &c. Parts of our improvements are applicable to lamps known as "electric-arc" lamps, and also to lamps known as "electric incandescent" lamps, and other parts are applicable only to the latter.

The objects of our improvements are, first, to provide facilities for taking up superfluous lead or conductors when the distance between the lamp and its support is varied; secondly, to provide a device for securing the reflector of an incandescent-lamp fitting, and, thirdly, to provide facilities for raising or lowering arc lamps and their fittings, in combination with the taking up of the superfluous lead or conductors when the lamp is raised or the supporting-arm shortened. We attain these objects by the mechanism illustrated in the accompanying drawings, in which—

Figure 1 is a front elevation of a fitting for incandescent lamps embracing these our improvements. Fig. 2 is a side elevation of Fig. 1, with part of the claw and reflector removed; Fig. 3, a detailed view of double-hinged joint, illustrating its use; Figs. 4, 5, and 6, details of spring winding-drums for taking up superfluous lead or conductors. Fig. 7 shows the taking-up device applied to a fitting with two or more lamps. Fig. 8 shows the winding-drums arranged edge to edge. Fig. 9 is a front view and side sectional elevation, in detail, of a modified form of winding-drum, and of securing the reversing-point of the lead. Fig. 10 is a front view of the winding-drums arranged with a hoisting-cord and guide-frame, intended more especially for use with arc lamps. Fig. 11 is a side sectional view of Fig. 10 upon line A B. Fig. 12 is a front view of combined hoisting-drum and winding-drums, also for use with arc lamps, and Fig. 13, a side view of Fig. 12.

Similar letters refer to similar parts throughout the several views of each arrangement.

$a$ is an incandescent electric lamp, which is varied in its distance from the ceiling, &c., by means of the telescopic tube $b$, (see Figs. 1, 2, 7, and 8,) or the device employing a hoisting-cord (see Figs. 10, 11, 12, and 13) may be used; but this latter is generally more suitable for arc lamps.

$d$ $d$ are the leads or conductors to the lamps.

$e$ $e$ are drums for taking up the superfluous lead.

The drums $e$ $e$ are each provided with a hook, pin, or other fastening device upon their periphery, to which a point in the lead is secured. At this point the lead is doubled round, so that the direction of the winding upon the drum is reversed. A hook for this purpose is shown in detail at $f$ in Figs. 4 and 6, and a pin for the same purpose is shown at $f'$ in Fig. 9. By this it will be seen that the lead $d$ is wound upon or unwound from off the drum $e$ at both sides simultaneously.

We provide for the automatic winding of the leads upon their drums by the spring $g$, (see Figs. 5 and 6,) the one end of which is secured to the spindle $h$ upon the peg $i$ and its other end to the interior of the barrel or drum upon the peg $j$. Thus, when the lamp is pulled down or lowered, a rotary motion is given to the drum $e$ by the pull of the lead $d$ in the direction shown by the arrow, and thereby the spring $g$ is wound up, so that when the fitting or device is drawn out to its full extent the spring is wound up. When the fitting or device is being closed up, the tension of the spring causes the drums to revolve and to wind up the superfluous lead. The drums $e$ $e$, with their spindle, move a distance equal to half the amount by which the lamp is raised or lowered.

Figs. 10, 11, 12, and 13 show convenient forms of the device for taking up superfluous lead when applied in connection with suspension or hoisting gear for arc lamps.

Figs. 10 and 11 are front and side views of the device when spring-drums are employed similar to those shown in detail in Figs. 5, 6, and 9. A suspension-cord $c$ takes the place of the telescopic arrangement described in connection with incandescent-lamp fittings. This cord $c$ passes through a central hole in the spindle between the drums, and also through two holes in a guide-frame $o$, which is carried by the ends of the spindle. The guide-frame has four other holes in it for the leads or conductors to pass through, and the cable or lead is prevented from chafing against the edges of each hole by small pulleys, as shown at $s\ s\ s\ s$, Fig. 10. When the lamp is lowered by means of the cord $c$, the cables cause the drums to revolve and wind up the springs. Again, when the lamp is raised, the tension of the springs causes the drums to revolve and wind up the superfluous lead.

Figs. 12 and 13 show a simplified form of the device, in which springs and frame-work are dispensed with. Fig. 12 is a front view of the arrangement, which consists of three drums $e^2\ k\ e^2$, rigidly connected together, either made in one piece or built up in any suitable way. The diameter of the central drum $k$ must be greater than the diameter of the outside drums $e^2\ e^2$. The leads or conductors are arranged and secured on the peripheries of the drums $e^2\ e^2$ in the manner described, and illustrated with reference to Figs. 4, 5, 6, and 9. The hoisting cord or rope $c$ is secured at one end to an eye or other fastening device on the periphery of the central drum $k$, and a length of cord, the amount depending upon the distance by which the lamp is required to be raised or lowered, and also upon the relative diameter of the drum $k$ to the drums $e^2\ e^2$, is wound upon it in such a direction that if the drums are revolved in a direction which will wind up the leads or conductors the cord $c$ will be unwound from off the drum $k$, and vice versa. When the lamp is in its highest position, the cord $c$ will be unwound from the drum $k$ and the leads or conductors $d\ d\ d\ d$ will be coiled upon the drums $e^2\ e^2$. When the lamp is in its lowest position—as, for instance, for trimming or cleaning—the leads $d\ d\ d\ d$ are unwound from their respective parts of the drums $e^2\ e^2$, the end of the hoisting-cord is wound upon the drum $k$, and the drums occupy an approximately central position between the lamp and the point of suspension on the mast or other fixture. It will be seen that whether the lamp is up, down, or partly down, the drums will be approximately midway between the lamp and the supporting-fixture.

In each of the foregoing arrangements sufficient lead is provided to allow of a half-turn at least of lead remaining on the drums $e^2\ e^2$ when the lamp is lowered to its fullest extent.

The drums $e\ e$ (see Fig. 8) may be placed edge to edge upon the sliding piece $h'$, if desired.

In Fig. 9 a recess $l$ is shown in the drum $e'$, to allow of the lead $d$ passing round the pin $f'$.

In Figs. 1 and 2, $p\ p'\ p^2$ are the claws which carry the reflector $u$ and the incandescent lamp $a$ and the bent tube $r$ and lamp-holder $r'$. Upon the claw $p$ is formed a collar $q$, through which the upper part of the bent tube $r$, carrying the lamp-holder $r'$, passes. The tube $r$ may be adjusted in position and secured by the screw-pin $t$. $u$ is the reflector carried by the three claws $p\ p'\ p^2$, the number of which latter may be increased, if desired. Upon one or more of these claws is hinged a depending hook $v$. When placing the reflector $u$ in position, the depending hook or hooks $v$ are swung out of the way until the rim of the reflector has passed within it or them, when the said hook or hooks are swung back to catch the rim and support it. To the under side of the claws the spring $w$ is secured, which presses upon the upper side of the reflector and holds it firmly in position, yet without undue rigidity. Upon the upper part of the claws is a projection $x$, which is hinged into a double joint-piece $y$. The lower end of the tube $b$ is hinged into the opposite end of the joint-piece $y$, the axis of the joints or hinges being at right angles to each other, so that a universal joint is formed. The two hinge-joints may be made capable of being tightened up after wear, or spring-washers may be used, so that they may remain in any desired position after adjustment; but generally this will not be required, as the wear will be very small. By the universal joint the reflector, &c., can be turned or adjusted through an extensive range of angles or directions, similarly as shown by dotted lines in Fig. 3.

If it is desired to make the peripheries of the lead-drums of metal or other conducting substance, an insulating-ring is inserted at $z$. (See Figs. 5, 6, and 9.) The eyelets or guides, &c., through or against which the leads pass, are also preferably provided with small insulating rings or linings.

What we claim as our invention, and desire to secure by Letters Patent, is—

1. In an electric-light fitting, the combination of the spring-drums $e\ e'$ and the electric conducting-cords $d\ d$, attached at their centers to the peripheries of the drums, and having their leads reversely coiled thereon, as shown and described.

2. In an electric-light fitting, the combination of the drums $e^2\ e^2$, having their leads reversely coiled thereon, with the hoisting-drum $k$, substantially as described.

3. In an electric-lamp fitting, the combination of the claws $p\ p'\ p^2$, having upon one or more of such claws the pivoted hook $v$, with the spring $w$, substantially as described and illustrated, and for the purposes specified.

WILLIAM BROOKS SAYERS.
WILSON HENRY STURGE.

Witnesses:
CHARLES T. POWELL,
ERNEST W. JONES.